United States Patent

Pywell et al.

[11] Patent Number: 5,913,486
[45] Date of Patent: Jun. 22, 1999

[54] SEAT BELT TENSIONER

[75] Inventors: James Frederick Pywell, Shelby Township, Macomb County, Mich.; James Orin Lair, Jr., Tempe, Ariz.; Michael Anthony Brown; Kevin John Maikis, both of Gilbert, Ariz.

[73] Assignees: General Motors Corporation, Detroit, Mich.; Talley Defense Systems, Inc., Mesa, Ariz.

[21] Appl. No.: 09/024,711

[22] Filed: Feb. 17, 1998

[51] Int. Cl.⁶ .................................................. B60R 22/46
[52] U.S. Cl. ............................................................ 242/374
[58] Field of Search .............................. 242/374, 379.1; 280/806; 297/476, 478, 479, 480; 244/122 R

[56] References Cited

U.S. PATENT DOCUMENTS

| | | |
|---|---|---|
| 3,389,873 | 6/1968 | Filippi et al. . |
| 3,522,918 | 8/1970 | Wrighton . |
| 3,531,061 | 9/1970 | Davies . |
| 3,557,914 | 1/1971 | Tanaka ..................... 297/479 |
| 3,667,806 | 6/1972 | Sprecher ................... 297/479 |
| 3,881,667 | 5/1975 | Tandetzke ................ 297/478 |
| 3,970,266 | 7/1976 | Doin et al. . |
| 4,006,644 | 2/1977 | Beier ........................ 297/478 |
| 4,056,242 | 11/1977 | Herrmann . |
| 4,286,758 | 9/1981 | Inukai et al. . |
| 4,372,501 | 2/1983 | Inukai . |
| 4,447,017 | 5/1984 | Inukai . |
| 5,397,075 | 3/1995 | Behr . |
| 5,433,222 | 7/1995 | Modinger et al. . |
| 5,492,368 | 2/1996 | Pywell et al. . |
| 5,553,890 | 9/1996 | Buhr et al. . |

FOREIGN PATENT DOCUMENTS 2 249 786   4/1974   Germany ................................ 297/480

Primary Examiner—John P. Darling
Attorney, Agent, or Firm—Charles E. Leahy; Kathryn A. Marra

[57] ABSTRACT

A housing has a chamber and a piston is slidablyally mounted in the chamber. The piston has a piston shaft which extends outwardly of the housing and has a seat belt reel attached thereto. A pyrotechnic device is energizable to introduce pressurized gas into the chamber and thereby translate the piston within the chamber. Screw threads are provided between the housing and the piston shaft so that translation of the piston shaft upon energization of the pyrotechnic device will cause the screws to impart rotation to the piston shaft and the seat reel. Accordingly, the seat belt reel is simultaneously rotated to wind the belt and also projected outwardly with respect to the housing so that the belt is tensioned by both a rotary and a projecting action of the seat belt reel.

2 Claims, 2 Drawing Sheets

SEAT BELT TENSIONER

TECHNICAL FIELD

The invention relates to a pyrotechnic powered seat belt tensioner and more particularly provides a pyrotechnic device which simultaneously rotates a belt reel and projects the reel outwardly with respect to a fixed housing.

BACKGROUND OF THE INVENTION

It is well known in motor vehicles to restrain a seated occupant by a lap belt and a shoulder belt which reach around the occupant torso.

It is also known to provide a seat belt tensioning device which forcibly tensions the seat belt in response to a vehicle condition such as vehicle deceleration.

In one form, the seat belt tensioning device has included a seat belt reel which is forcibly rotated by a pyrotechnic charge in order to wind up the belt and thereby tension the belt about the occupant. The present invention provides a new and improved seat belt tensioning device.

SUMMARY OF THE INVENTION

According to the invention, a housing has a chamber and a piston is slidably mounted in the chamber. The piston has a piston shaft which extends outwardly of the housing and has a seat belt reel attached thereto. A pyrotechnic device is energizable to introduce pressurized gas into the chamber and thereby translate the piston within the chamber. Screw threads are provided between the housing and the piston shaft so that translation of the piston shaft upon energization of the pyrotechnic device will cause the screw threads to impart rotation to the piston shaft and the seat belt reel. Accordingly, the seat belt reel is simultaneously rotated to wind the belt and also projected outwardly with respect to the housing so that the belt is tensioned by both a rotation and projection of the seat belt reel.

BRIEF DESCRIPTION OF THE DRAWINGS

These and other objects, features and advantages of the invention will become apparent upon consideration of the Description of the Preferred Embodiment and the appended drawings which.

DESCRIPTION OF THE PREFERRED EMBODIMENT

Figure 1:
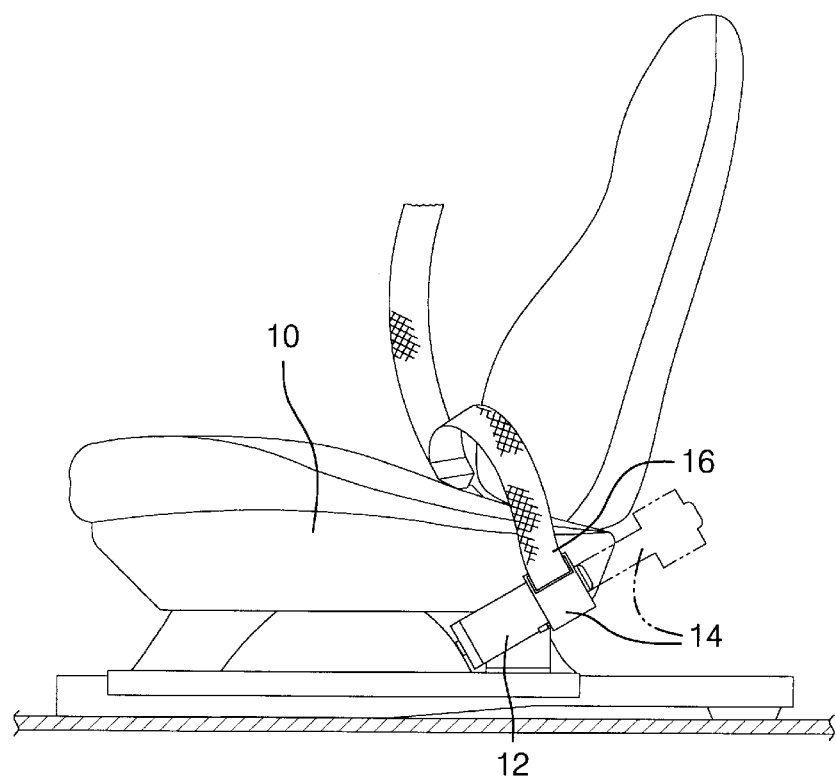
FIG. 1 is a side elevation view of a vehicle seat.

Referring to FIG. 1, a conventional vehicle seat 10 has a seat belt tensioning device 12 including a belt reel 14 to which a lap belt 16 is attached.

Figure 2:
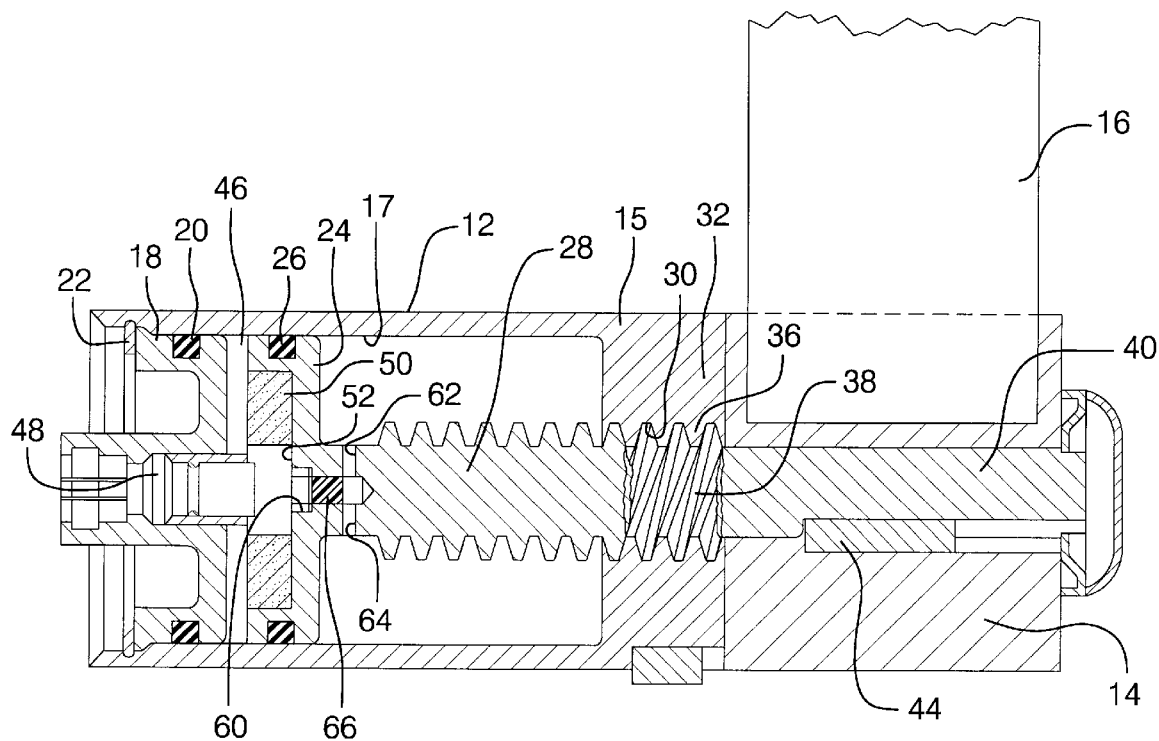
FIG. 2 is a section view taken through the seat belt tensioner of FIG. 1.
Figure 3:
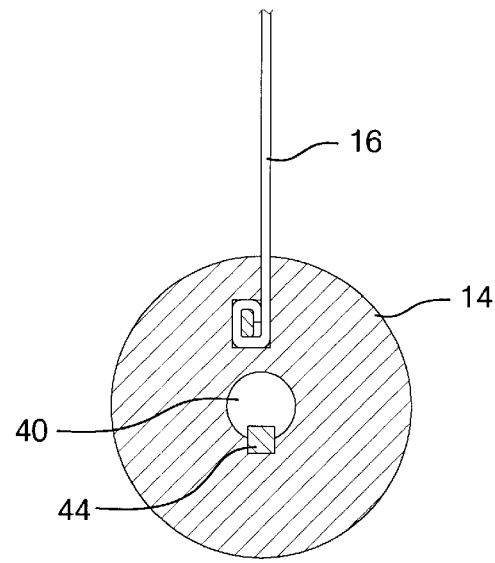
FIG. 3 is a section view taken in the direction of arrows 3—3 of FIG. 2.

Referring to FIG. 2, it is seen that the seat belt tensioning device 12 includes a housing 15 having a bore 17 which is closed at its left end by a plug 18, seal 20 and retaining ring 22. A piston 24 is slidable within the bore 16 and carries a seal 26. The piston 24 carries a piston shaft 28 which passes through an opening 30 in the right hand end wall 32 of housing 12. The opening 30 and the piston shaft 28 carry complimentary threads 36 and 38 which will force the piston 24 and piston shaft 28 to rotate upon movement of the piston 24 within the housing 15. The piston shaft 28 includes an outer end 40 which extends outwardly of the housing 15 and has the belt reel 14 attached thereto by a keyway 44.

Referring again to FIG. 2, it is seen that a chamber 46 is defined between the plug 18 and piston 24. A pyrotechnic initiator assembly 48 is mounted within the housing plug 18. A pyrotechnic charge 50 is mounted in a recess 52 of the piston 24.

Figure 4:
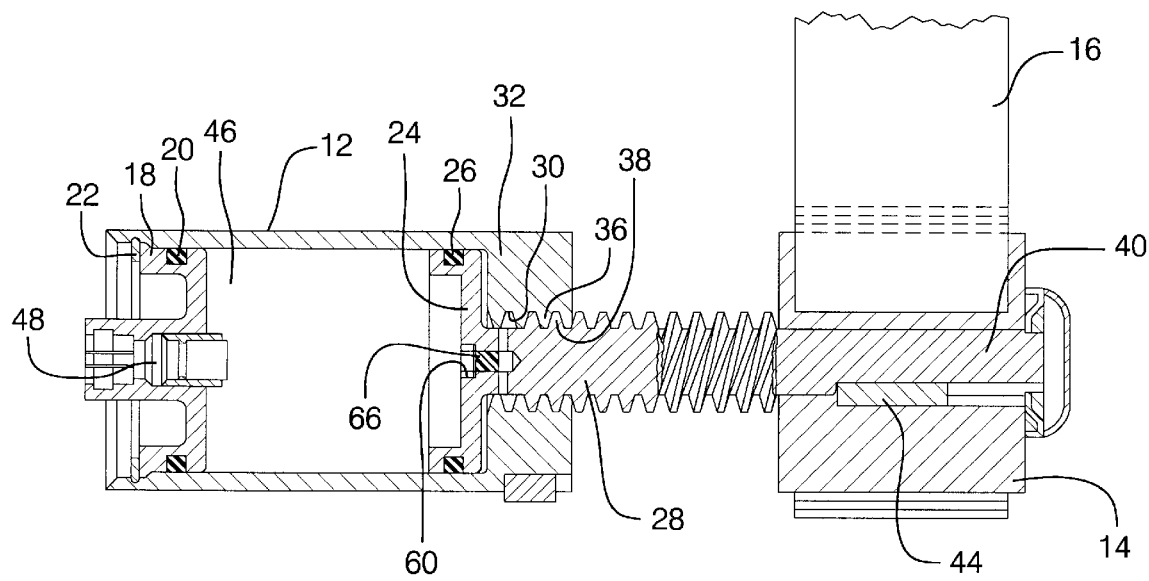
FIG. 4 is a view similar to FIG. 2 but showing the pyrotechnic device having been energized to rotate the reel and project the reel outwardly of the housing.

The initiator 48 is suitably coupled to an ignition circuit which will energize the initiator 48, to in turn ignite the pyrotechnic charge 50. The rapid build-up of pressure in the chamber 46 forces the piston 24 and piston shaft 28 rightwardly, The threads 36 of the housing 15 and threads 38 of the piston shaft 28 interact to cause the piston 24 and piston shaft 28 to interact to cause the piston 24 and piston shaft 28 to rotate as they travel rightwardly. Accordingly, the reel 14 is rotated to wind-up the belt 16 and, as viewed in FIG. 4, is also projected axially away from the housing 15. Accordingly, referring again to FIG. 1, it is seen that the reel 14 has been moved rearwardly to the phantom line indicated position so that the belt 16 is tightened around the seated occupant by the simultaneous wind-up of the belt and also the rearward projecting movement of the reel.

Piston 24 includes an axial passage 60 and radial passages 62 and 64 which communicate between the left and right sides of piston 24. A blow-out plug 66 of suitable elastomeric or other material normally closes the passage but opens under excess pressure condition to control pressure build-up and rate of piston travel.

Thus, it is seen that the invention provides a new and improved seat belt tensioning reel having a dual tensioning action including belt wind-up and simultaneously axial projecting movement of the reel. It will be understood that although FIG. 1 shows the tensioning device 12 mounted on a seat, the tensioning retractor could be mounted on the vehicle floor, or on the vehicle pillar or elsewhere on the vehicle as appropriate to attain the desired occupant kinematics.

We claim:

1. A seat belt tensioner comprising:
    a reel having the seat belt attached;
    a housing having a chamber;
    a piston slidably mounted in the chamber and having a piston shaft;
    a seat belt reel attached to the piston shaft;
    a pyrotechnic device energizable to introduce pressurized gas into the chamber and thereby translate the piston within the chamber;
    and screw threads acting between the housing and the chamber so that translation of the piston shaft imparts rotation to the piston shaft and the seat belt reel and thereby winds up the seat belt.

2. A seat belt tensioner comprising:
    a reel having the seat belt attached;
    a housing having a chamber;

a piston slidably mounted in the chamber and having a piston shaft extending outwardly of the housing;

a seat belt reel attached to the piston shaft outwardly of the housing;

a pyrotechnic device energizable to introduce pressurized gas into the chamber and thereby translate the piston within the chamber to project the piston shaft and the seat belt reel outwardly with respect to the housing;

and screw threads acting between the housing and the chamber so that translation of the piston shaft imparts rotation to the piston shaft and the seat belt reel and thereby winds up the seat belt as the reel is simultaneously projected outwardly with respect to the housing.

* * * * *